United States Patent
Horen et al.

(10) Patent No.: US 7,524,132 B2
(45) Date of Patent: Apr. 28, 2009

(54) PINCH BOLT-SPLIT HUB ATTACHMENT ASSEMBLY

(75) Inventors: Jezrah E. Horen, Fairland, IN (US); Rayman Eton Bazieio, Indianapolis, IN (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 11/771,321

(22) Filed: Jun. 29, 2007

(65) Prior Publication Data

US 2009/0003930 A1    Jan. 1, 2009

(51) Int. Cl.
*F16B 7/18* (2006.01)

(52) U.S. Cl. .................. 403/354; 403/379.3; 403/383

(58) Field of Classification Search .............. 403/289, 403/290, 344, 354, 383, 194–196
See application file for complete search history.

(56) References Cited

U.S. PATENT DOCUMENTS

| | | | | |
|---|---|---|---|---|
| 2,077,181 A | * | 4/1937 | Morse | 439/361 |
| 2,933,934 A | * | 4/1960 | Haroldson | 474/180 |
| 3,065,760 A | * | 11/1962 | Cailas | 134/167 R |
| 3,709,534 A | * | 1/1973 | Coe | 403/360 |
| 4,033,703 A | * | 7/1977 | Slater | 408/211 |
| 4,177,685 A | * | 12/1979 | DeLancey | 474/113 |
| 4,506,559 A | * | 3/1985 | Francke et al. | 74/439 |
| 4,603,597 A | * | 8/1986 | Onorati | 74/434 |
| 4,836,485 A | * | 6/1989 | Cooper | 248/278.1 |
| 4,991,993 A | * | 2/1991 | Watlington et al. | 403/365 |
| 5,052,842 A | * | 10/1991 | Janatka | 403/14 |
| 5,141,350 A | * | 8/1992 | Hecke | 403/15 |
| 5,152,631 A | * | 10/1992 | Bauer | 403/372 |
| 5,383,741 A | * | 1/1995 | Vance et al. | 403/383 |
| 5,788,400 A | * | 8/1998 | Wey | 403/329 |
| 6,322,282 B1 | * | 11/2001 | Kussman et al. | 403/329 |
| 6,506,024 B1 | * | 1/2003 | Thompson et al. | 416/244 R |
| 2007/0163059 A1 | * | 7/2007 | Wimberley | 15/1 |

* cited by examiner

*Primary Examiner*—Daniel P Stodola
*Assistant Examiner*—Joshua T Kennedy

(57) ABSTRACT

The present invention provides an assembly for attaching a hub to a shaft. The hub, which may be a portion of a gear, pulley, chain sprocket or other power carrying device, includes a collar or annular wall having two axially extending relief cuts on opposite sides of a shaft opening, which define a pair of opposed projections or clamp members. The clamp members include opposed flats on the inside of the shaft opening which engage complementarily configured flats on the shaft. A threaded fastener such as a bolt extends through smooth radial bores in one clamp member and the shaft and into a complementarily threaded bore in the other clamp member. The internal flats of the hub include opposed arcuate, axially extending reliefs. The outside surface of the hub proximate the smooth bore defines a chordal surface which the bolt engages.

19 Claims, 2 Drawing Sheets

PINCH BOLT-SPLIT HUB ATTACHMENT ASSEMBLY

FIELD

The present disclosure relates to an attachment assembly for connecting a hub to a shaft and more particularly to an attachment means having a split hub which is clamped to a shaft by a pinch bolt.

BACKGROUND

The statements in this section merely provide background information related to the present disclosure and may or may not constitute prior art.

One of the most common engineering issues encountered in the design of mechanical devices involves the choice of the attachment means between a rotating shaft and a hub of a pulley, gear, chain sprocket or other power carrying component. While there are several common and accepted means, each have factors which, in certain circumstances, recommend that means and in other circumstances militate against it. For example, while a press fit connection is relatively simple and inexpensive, it is not easily serviceable, i.e., the components are not easily separated. Interengaging splines, while easily serviced are not resistant to joint motion and therefore subject to wear. Tapered connections exhibit no joint motion but since they are extremely stiff, they are sensitive to load relaxation. Keyed joints, while serviceable and relatively wear resistant, complicate production assembly.

From the foregoing, it is apparent that new and improved means for positively and removably attaching a hub of any device such as, for example, a gear or pulley to a fixed or rotating shaft are both possible and desirable.

SUMMARY

The present invention provides an assembly for attaching a hub to a shaft. The hub, which may be a portion of a gear, pulley, chain sprocket or other power carrying device, includes a collar or annular wall having two axially extending relief cuts on opposite sides of a shaft opening, which define a pair of opposed projections or clamp members. The clamp members include opposed, parallel flats on the inside of the shaft opening which engage complementarily configured flats on the shaft. A threaded fastener such as a bolt extends through smooth radial bores in one clamp member and the shaft and into a complementarily threaded bore in the other clamp member. The internal flats of the hub include opposed arcuate, axially extending reliefs. The outside surface of the hub proximate the smooth bore defines a chordal surface which the bolt engages.

Thus it is an object of the present invention to provide an improved assembly for securing a hub to a rotating shaft.

It is a further object of the present invention to provide a hub having internal flats and axially extending relief cuts.

It is a still further object of the present invention to provide a hub having a smooth bore and an aligned threaded bore for receiving a threaded fastener.

It is a still further object of the present invention to provide a hub having internal flats which include opposed arcuate, axially extending reliefs.

Further features, advantages and areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
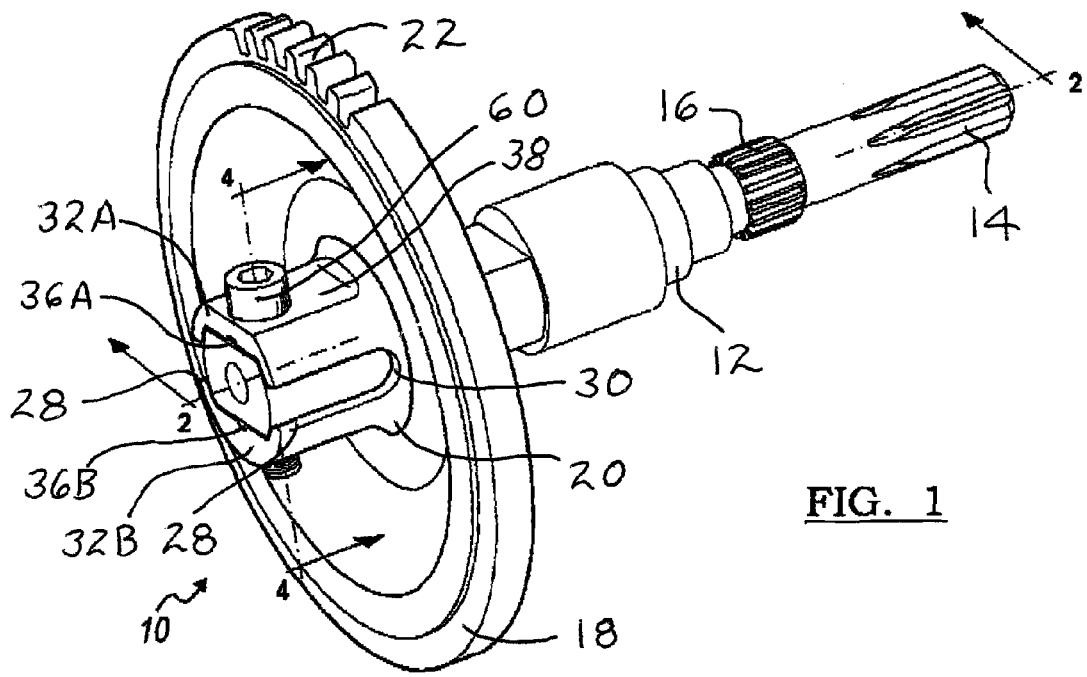
FIG. 1 is a perspective view of a gear, hub and shaft incorporating the present invention.
Figure 2:
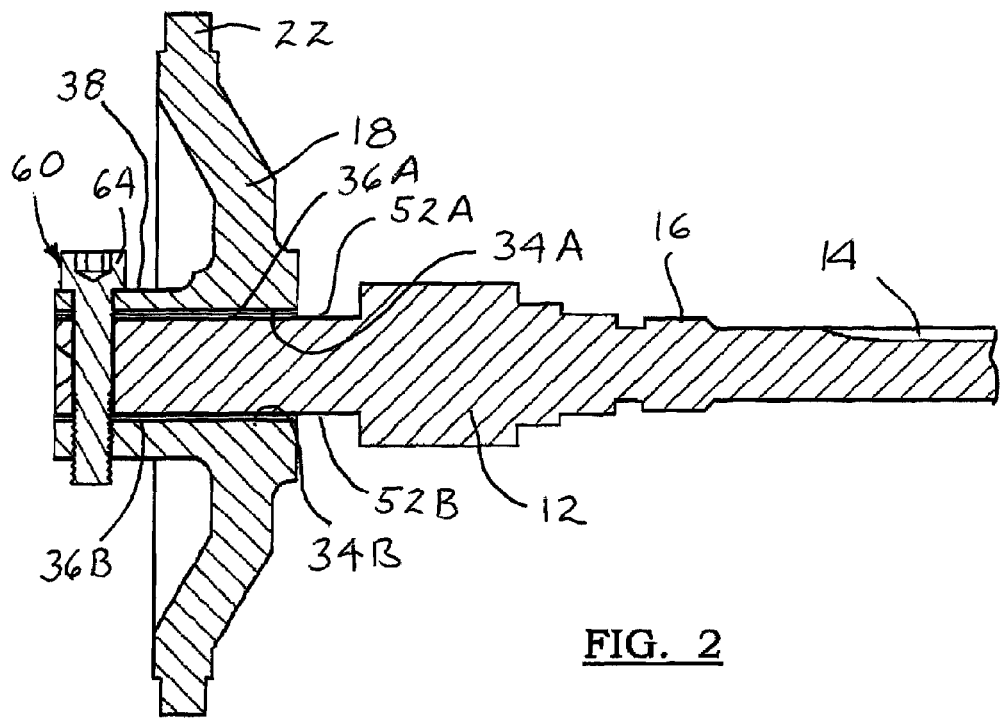
FIG. 2 is a full, sectional view of a gear, hub and shaft incorporating the present invention taken along line 2-2 of FIG. 1.
Figure 4:
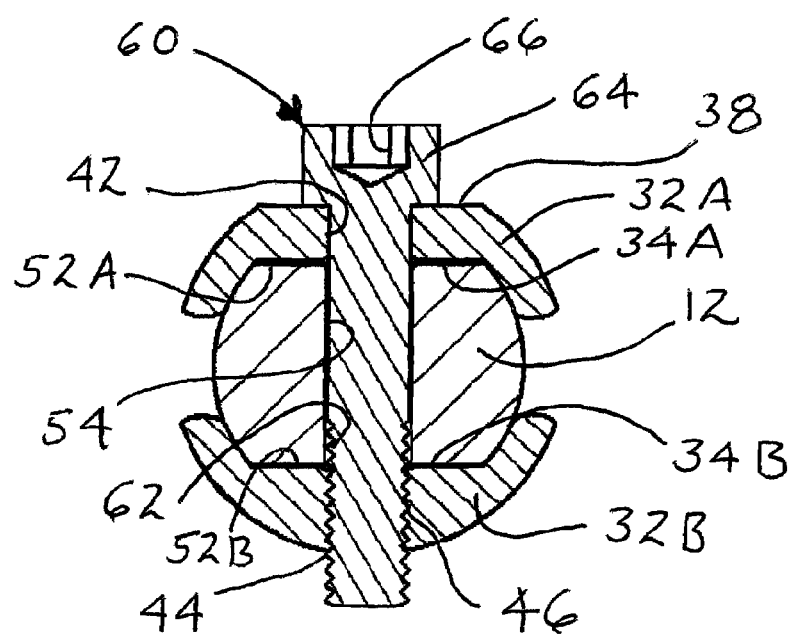
FIG. 4 is an enlarged, full sectional view of a hub and shaft according to the present invention taken alone line 4-4 of FIG. 1.

With reference to FIGS. 1, 2 and 4, an assembly for attaching or connecting a hub and a shaft is illustrated and generally designated by the reference number 10. The connecting assembly 10 positively secures or connects a shaft 12 and a hub 20. The shaft 12 may be a component of a transmission or other power carrying or controlling apparatus (not illustrated) and which thus may include, for example, a male spline set 14 and a spur gear 16 or other power carrying or transferring components.

Figure 3:
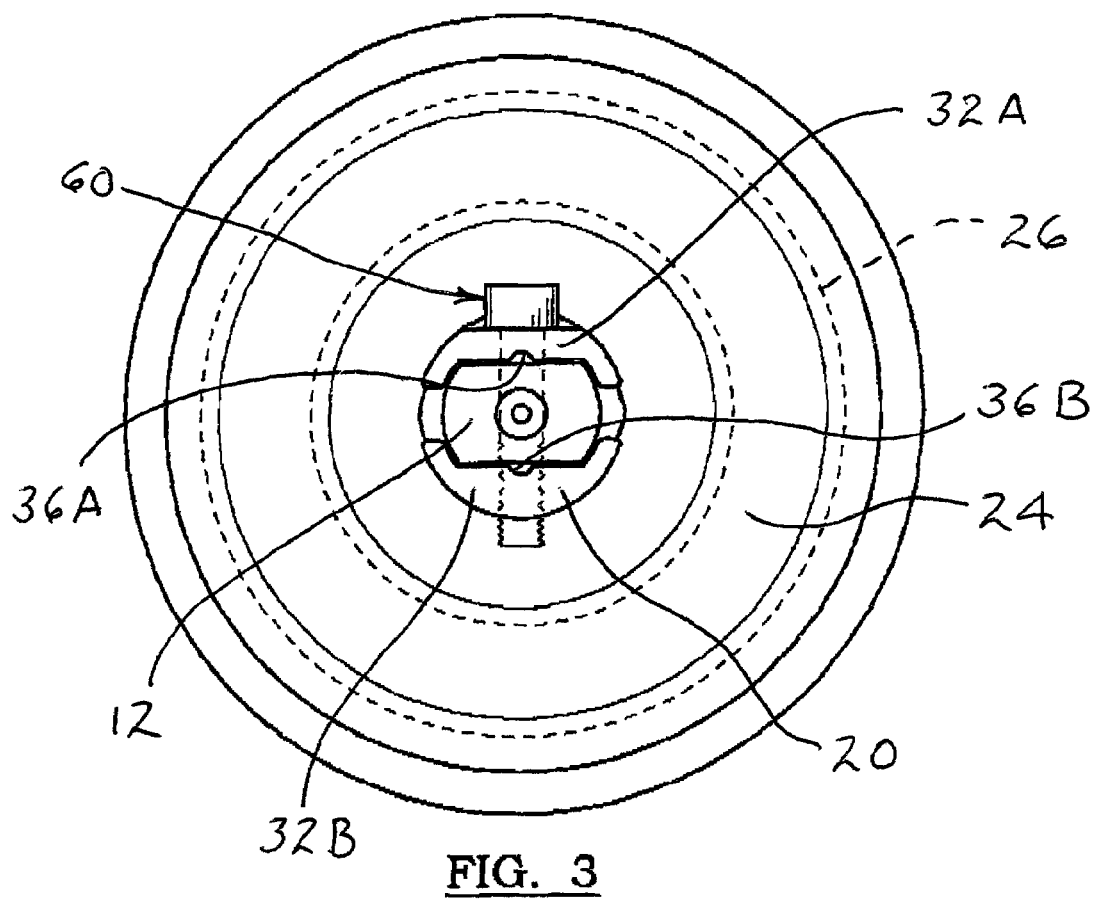
FIG. 3 is an end elevational view of a pulley, hub and shaft incorporating the present invention.

Concentrically disposed on the shaft 12 is a gear 18 including a coaxial, generally annular hub 20. The gear 18 includes gear teeth 22 disposed about its periphery. Alternatively and as illustrated in FIG. 3, the hub 20 may be a portion of a pulley 24 having one or more belt grooves 26, a chain sprocket having chain engaging teeth or other power transferring feature.

The annular hub 20 includes a pair of diametrically opposed slots or relief cuts 28 which terminate in respective semi-circular end regions 30, one of which is illustrated in FIG. 1. The pair of opposed slots or relief cuts 28 define a corresponding diametrically opposed pair of arcuate flanges, projections or clamp members: a first or upper clamp member 32A and a second or lower clamp member 32B. The first or upper arcuate clamp member 32A includes a first or upper internal flat or chordal surface 34A and the second or lower arcuate clamp member 32B includes a parallel, second or lower internal flat or chordal surface 34B. Where the inside of the hub 20 transitions from the flats or chordal surfaces 34A and 34B to a pilot bore, a corner relief is provided to eliminate any interference (not illustrated). Centered on the first or upper chordal surface 34A, that is, bisected by a radial line normal to the chordal surface 34A, is an axially extending first concave or arcuate relief or groove 36A. The ratio of the width of the first arcuate groove 36A to the width of the first chordal surface 34A may be adjusted over a range depending on the size of the hub 20, the material from which it is fabricated and other factors. Values in the range of 1:4 to 1:7 are viewed as reasonable although certain applications may perform best with ratios outside this range. Centered on the second or lower chordal surface 34B, that is, bisected by a radial line normal to the second chordal surface 34B, is an axially extending second concave or arcuate relief or groove 36B. The same ratio relationship described directly above with regard to the first relief or groove 36A applies to the second relief or groove 36B. The first and second reliefs or grooves 36A and 36B compensate for any crown or surface irregularities of the shaft 12 and enhance intimate contact between the clamp members 32A and 32B and the shaft 12.

The first or upper clamp member 32A also includes an external flat or chordal surface 38 which is parallel to the first internal flat or chordal surface 34A. Extending normal to the chordal surfaces 34A and 38 is a first smooth walled, radially oriented through bore 42. The second or lower flange or clamp assembly 32B includes a second, radially oriented through bore 44 having female threads 46. The first smooth walled bore 42 and the second, threaded bore 44 are coaxially aligned.

As illustrated in FIGS. 2 and 4, the shaft 12 includes two opposed external flats or chordal surfaces 52A and 52B which are just slightly smaller than and essentially complementary to the internal flats or chordal surfaces 34A and 34B of the respective clamp members 32A and 32B such that the hub 20 may be readily and easily slid onto and off the shaft 12. The shaft 12 also includes a smooth walled, through radial bore 54 which is aligned with the first and second radial bores 42 and 44 in the hub 20.

A pinch bolt or threaded fastener 60 or similar component is received within the first smooth radial bore 42 and the radial bore 54 and includes male threads 62 complementary to the female threads 46 in the second radial bore 44. The threaded fastener 60 preferably includes a head 64 having a tool engageable fitting such as, for example, an Allen wrench socket 66. It should be noted that the weight of material removed from the first or upper clamp member 32A to create the external flat or chordal surface 38 is preferably equal to the weight of the head 64 of the threaded fastener 60. Additionally, the threaded fastener 60 is sized so that when installed and tightened in the clamp members 32A and 32B, its end is essentially coincident with the adjacent external surface of the second or lower clamp member 32B. This configuration improves the dynamic balance of the shaft 12 and the hub 20.

It will be appreciated that a hub and shaft connecting assembly 10 according to the present invention provides a positive and secure connection between a hub 20 of a gear 18, a pulley 26, a sprocket or other power carrying component and a shaft 12 by virtue of the pinching or clamping engagement of the internal flats or chordal surfaces 34A and 34B of the hub 20 and the external flats or chordal surfaces 52A and 52B of the shaft 12 when the threaded fastener 60 is tightened. Such positive connection significantly reduces fretting, that is, component wear caused by repeated small relative movement between mating surfaces, of the shaft 12 and the hub 20. Additionally, it will be appreciated that this positive connection may be readily and easily disassembled by loosening and removing the threaded fastener 60. Relaxation of the clamp members 32A and 32B accompanying such action facilitates ready and easy axial removal of the hub 20 and the associated gear 18 or the pulley 26 from the shaft 12. Finally, although the invention has been described as a connection between a hub 20 of a gear 18, a pulley 24 or chain sprocket and shaft 12, it should be appreciated that the connection of the present invention is equally suitable for use with many other components and machine parts in both stationary and non-stationary applications.

The description of the invention is merely exemplary in nature and variations that do not depart from the gist of the invention are intended to be within the scope of the invention. Such variations are not to be regarded as a departure from the spirit and scope of the invention.

What is claimed is:

1. A hub and shaft attachment assembly, comprising, in combination,
    a hub having a pair of axially extending slots defining an opposed pair of flanges, each of said opposed flanges having an internal chordal surface, one of said flanges having an exterior flat and a smooth radial bore, another of said flanges having a threaded radial bore aligned with said smooth radial bore,
    a pair of opposing arcuate reliefs centered on the internal chordal surfaces, the pair of opposing arcuate reliefs disposed axially along the hub,
    a shaft having a pair of external chordal surfaces and a smooth radial bore, and
    a fastener extending through said bores and having a head disposed proximate said exterior flat, wherein the fastener further comprises a head portion disposed adjacent the external flat surface of a first of the opposed pair of clamp members, the head portion having a head mass, wherein the first of the opposing pair of clamp members has a first mass and a second of the opposing pair of clamp members has a second mass, and wherein the second mass is substantially the same as the combination of the first mass and the head mass.

2. The hub and shaft attachment assembly of claim 1 wherein said internal chordal surfaces of said flanges and said exterior flat of said one of said flanges are parallel.

3. The hub and shaft attachment assembly of claim 1 further including gear teeth disposed about a periphery of said hub.

4. A hub and shaft connection assembly comprising in combination,
    a hub including a pair of opposed, axially extending relief cuts defining a pair of projections, each of said projections having an internal chordal surface having a chordal width, one of said projections having an exterior chordal surface and a first bore, another of said projections having a second bore aligned with said first bore,
    a pair of opposing arcuate reliefs centered on the internal chordal surfaces, the pair of opposing arcuate reliefs each having a relief width, wherein the relief width is between approximately ⅟7 and approximately ¼ of the chordal width,
    a shaft having a pair of external chordal surfaces and a third bore, and
    a fastener extending through said bores in said hub and said shaft, wherein the fastener further comprises a head portion disposed adjacent the external flat surface of a first of the opposed pair of clamp members, the head portion having a head moment of inertia, wherein the first of the opposing pair of clamp members has a first moment of inertia and a second of the opposing pair of clamp members has a second moment of inertia, and wherein the second moment of inertia is substantially the same as the combination of the first moment of inertia and the head moment of inertia.

5. The hub and shaft connection assembly of claim 4 wherein said projections are diametrically opposed.

6. The hub and shaft connection assembly of claim 4 wherein said axially extending arcuate reliefs are centered on said chordal surfaces.

7. The hub and shaft connection assembly of claim 4 wherein said radial bore is normal to said exterior chordal surface of said one of said projections.

8. The hub and shaft connection assembly of claim 4 wherein said bores in said shaft and said one of said projections is smooth walled.

9. The hub and shaft connection assembly of claim 4 wherein said bore in said another of said projections is threaded.

10. The hub and shaft connection assembly of claim 4 wherein said fastener includes a head disposed proximate said exterior chordal surface of said hub.

11. A hub and shaft securement assembly comprising, in combination,
- a hub having a pair of opposed, axially extending slots defining an opposed pair of clamp members, each of said clamp members having an internal flat surface, one of said clamp members having an external flat surface parallel to said internal flat surface and a first bore, another of said clamp members having a second bore,
- a pair of opposing arcuate reliefs centered on the internal flat surfaces, the pair of opposing arcuate reliefs disposed axially along the hub,
- a shaft member having a pair of external flat surfaces and a third bore, and
- a fastener extending through said bores in said clamp members and said shaft, wherein the fastener further comprises a head portion disposed adjacent the external flat surface of a first of the opposed pair of clamp members, the head portion having a head moment of inertia, wherein the first of the opposing pair of clamp members has a first moment of inertia and a second of the opposing pair of clamp members has a second moment of inertia, and wherein the second moment of inertia is substantially the same as the combination of the first moment of inertia and the head moment of inertia.

12. The hub and shaft securement assembly of claim 11 wherein said internal flat surfaces are parallel.

13. The hub and shaft securement assembly of claim 11 wherein said bores are radially oriented.

14. The hub and shaft securement assembly of claim 11 wherein said bore in said another of said clamp members is threaded.

15. The hub and shaft securement assembly of claim 11 wherein said pair of axially extending slots define semi-circular ends.

16. The hub and shaft securement assembly of claim 11 wherein said hub includes gear teeth.

17. The hub and shaft securement assembly of claim 11 wherein said hub is a pulley and includes at least one belt groove.

18. The hub and shaft securement assembly of claim 11, wherein the opposed pair of clamp members further comprise semi-cylindrical internal surface portions and the shaft member further comprises semi-cylindrical external surface portions, wherein the semi-cylindrical internal surface portions mate with the semi-cylindrical external surface portions when the fastener is tightened.

19. The hub and shaft securement assembly of claim 11, wherein the internal flat surfaces have a flat width and the pair of opposing arcuate reliefs have a relief width that is between approximately $1/7$ and approximately $1/4$ of the flat width.

* * * * *